July 28, 1936.  J. B. BORGADT  2,048,682
ELECTRIC TUBE WELDING MACHINE
Filed July 16, 1934  9 Sheets-Sheet 1

Fig.1

INVENTOR.
John B. Borgadt
BY
Soule & Leonard
ATTORNEYS.

July 28, 1936. J. B. BORGADT 2,048,682
ELECTRIC TUBE WELDING MACHINE
Filed July 16, 1934 9 Sheets-Sheet 2

FIG. 2

INVENTOR.
John B. Borgadt

Soule + Leonard
ATTORNEYS.

July 28, 1936.  J. B. BORGADT  2,048,682
ELECTRIC TUBE WELDING MACHINE
Filed July 16, 1934  9 Sheets-Sheet 6

INVENTOR.
John B. Borgadt
BY
Soule & Leonard
ATTORNEYS.

July 28, 1936.  J. B. BORGADT  2,048,682
ELECTRIC TUBE WELDING MACHINE
Filed July 16, 1934  9 Sheets-Sheet 8

Fig. 17

INVENTOR.
John B. Borgadt

Soule & Leonard
ATTORNEYS

July 28, 1936.  J. B. BORGADT  2,048,682
ELECTRIC TUBE WELDING MACHINE
Filed July 16, 1934  9 Sheets-Sheet 9

INVENTOR.
John B. Borgadt
BY
Soule & Leonard
ATTORNEYS.

Patented July 28, 1936

2,048,682

UNITED STATES PATENT OFFICE 2,048,682

ELECTRIC TUBE WELDING MACHINE

John B. Borgadt, Cleveland, Ohio

Application July 16, 1934, Serial No. 735,373

22 Claims. (Cl. 219—6)

This invention relates to a continuous electrical resistance welding apparatus particularly adapted for welding tubular metal stock, the general objects of the invention being to provide a simple and efficient means to convey current from a suitable transformer and apply it to the stock to be welded in a manner such that sparking and appreciable heating in undesirable places are largely or entirely eliminated and a true butt weld may be produced throughout a wide range of gauges of stock and kinds of metal.

Other objects are to provide a larger area of contact between the stock and electrical contactors than has heretofore been obtainable in electrical resistance welders of the continuous type and to maintain the contact surfaces of the contactors in firm uniform engagement with the stock over their entire area.

Still another object is to provide contactors in which the contact surface may travel inwardly with the stock as the seam cleft is closed while maintaining firm contact therewith under uniform pressure over the entire contact surface.

Equally important specific objects are to apply the current by means of sets of series of electrical contactors, one set at each side of the seam cleft, which contactors are engageable successively with the stock during travel of the stock; to effect the engagement with the stock of each contactor simultaneously over the entire length and breadth of its contact surface, and, likewise, to effect the withdrawal of the entire contact surface of each contactor instantaneously over its full length and breadth.

A correlative object is to provide means for positioning the contactors preparatory to engagement with the stock so that engagement of the contactor surfaces with the stock over the entire length and breadth of the contactor surfaces is effected instantaneously.

Other important objects are to reduce current losses in the apparatus itself by the elimination of all sliding contacts between the current conveying portions of the apparatus, by reduction of the length of the current conducting path and by elimination of losses at the points of connection of the various portions of the conductor means forming the path.

A more specific object is to provide a series of contactors which engage the stock surface under uniform pressure over a zone longer longitudinally of and wider circumferentially of the tubular stock than has heretofore been obtained, whereby more current can be employed more efficiently.

Another object is to provide an improved cooling means for automatically, continuously, and uniformly cooling the apparatus during the welding operations.

Other objects and advantages will become apparent from the following specification wherein reference is made to the drawings which illustrate a preferred embodiment of the present invention, the construction of which embodiment may be varied from the illustrative form without departing from the essential features of the invention.

Figure 1:
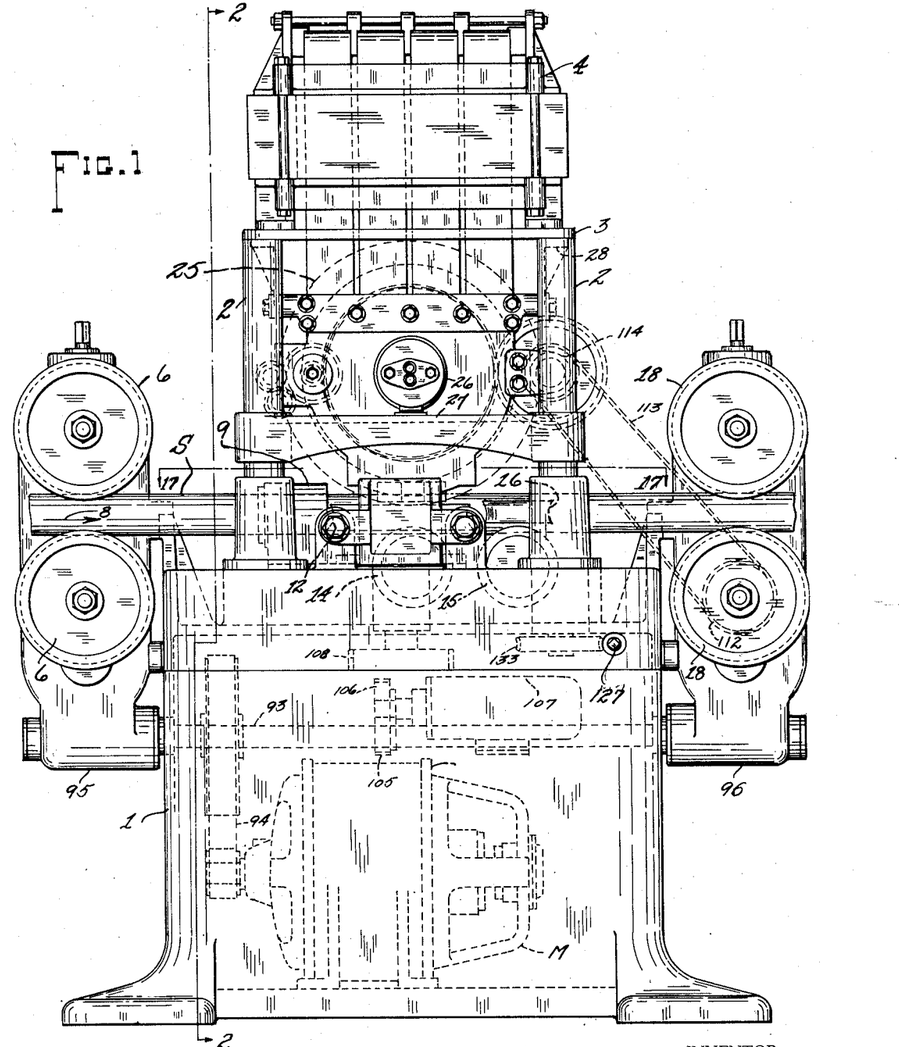
Fig. 1 is a side elevation of a welding apparatus, including part of the adjacent supplemental feed roll mechanism commonly used in connection with continuous tube welding.
Figure 2:
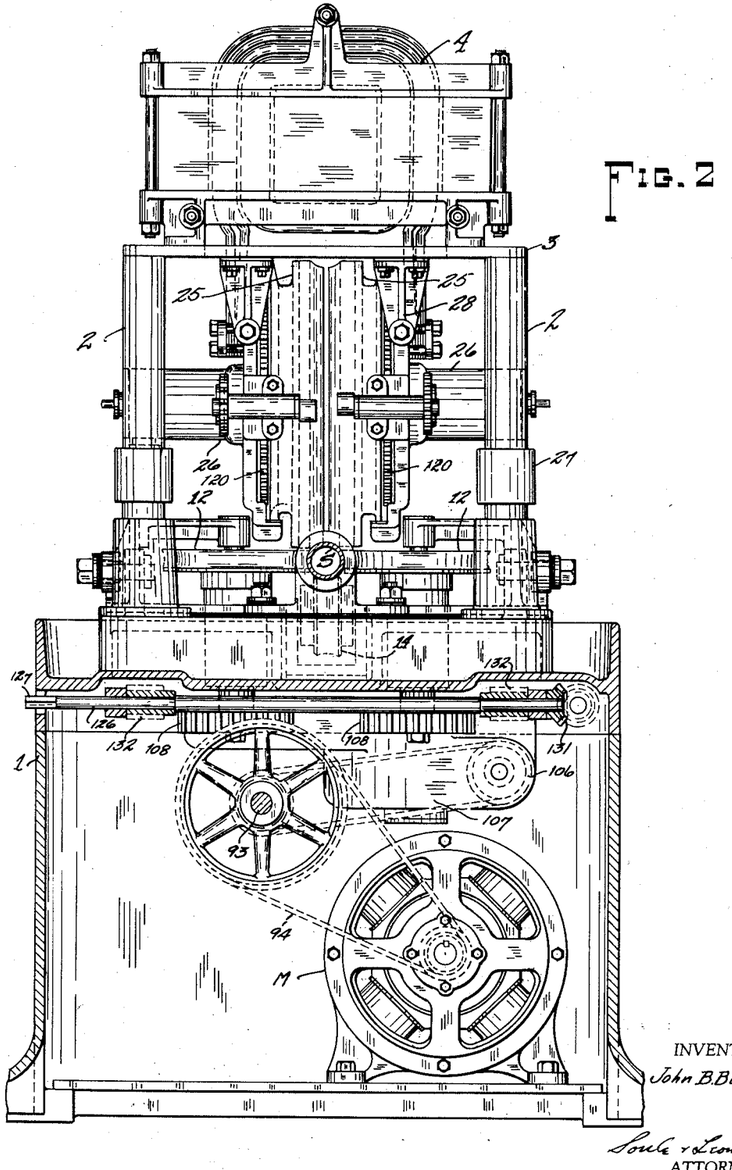
Fig. 2 is an end elevation, partly in section, of the apparatus illustrated in Fig. 1, and is taken on a plane indicated by the line 2—2 of Fig. 1.

Referring first to Figs. 1 and 2, the apparatus comprises a hollow base 1 on which are mounted upright supporting posts 2. Surmounting and carried by the supporting posts 2 is the support 3 of a transformer 4 of the proper capacity for the particular apparatus with which associated.

Carried on suitable brackets on the base 1 are the usual sets of stock feeding rolls 6 which, in the form illustrated, engage the stock S feeding the preformed tubular shape stock with seam cleft open and driving it into the welding throat of the apparatus.

Figure 18:
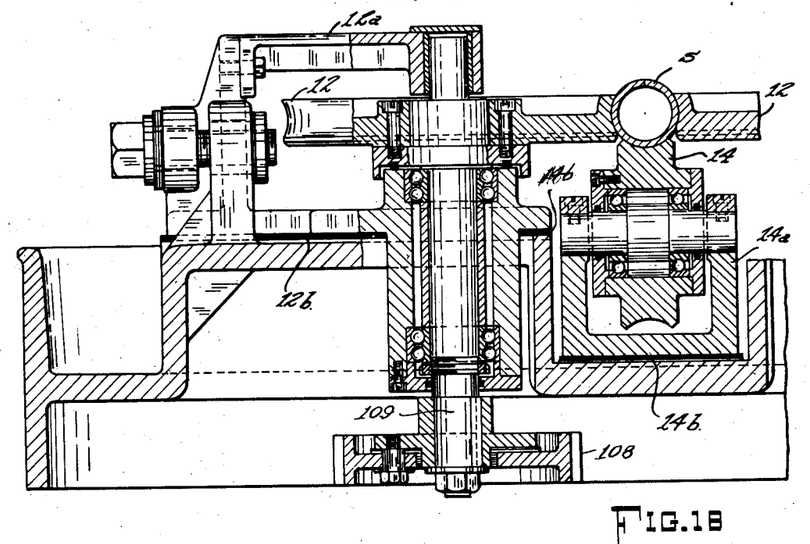
Figs. 18 and 19 are sectional views taken on planes indicated by the lines 18—18 and 19—19 respectively of Fig. 17.

In the form illustrated in Fig. 1, the stock passes into the apparatus from the left in the direction indicated by the arrow 8, and is continuously fed thereinto. A seam guide 9, carried on the base 1, engages the edges defining the seam cleft for retaining the tubular stock in proper circumferential alignment for the welding operation, and, likewise, for spacing the edges so that they will be brought together in the proper position relative to the contactors by the seam closing rolls 12 which, with the supporting roll 14, define the welding throat of the apparatus. The rolls 12 and 14 are carried by brackets 12a and 14a respectively, which are mounted on the base 1, the rolls being in position to close the seam in proper relation to the contactors to give the desired welding zone. Suitable electrical insulation is provided between the respective brackets and the base 1, as indicated at 12b and 14b respectively in Fig. 18, to eliminate any flow of current through the rolls carried thereby.

Further to the right in the direction of travel, and carried by the base 1, is an additional supporting upsetting roll 15 and cooperating upsetting rolls 16 by which pressure is applied to upset the stock sufficiently at the seam to effect a complete butt weld of the heated edge surfaces defining the cleft.

Figure 19:
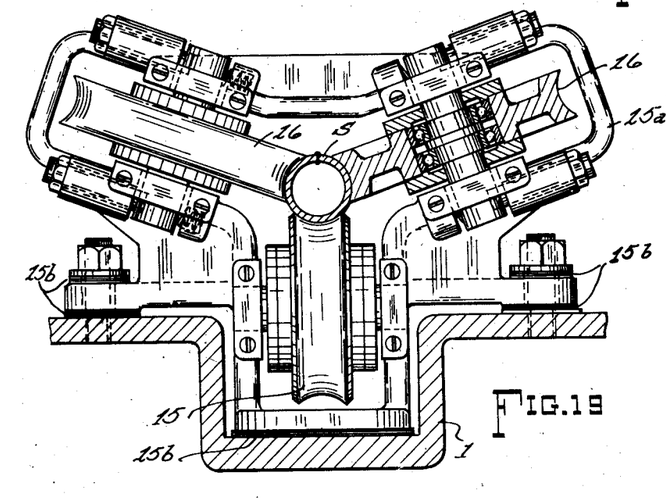

Upon further travel of the stock to the right, it passes into the usual driving rolls 18 which assist in driving the stock through the apparatus and which assist in maintaining the welded edges of the stock in firm contact a sufficient distance beyond the welding throat to permit cooling thereof to the proper degree. The rolls 15 and 16 are mounted on a suitable bracket 15a which may be slid to different positions longitudinally of the stock so as to be positioned in the desired relation to the welding throat. The brackets 15a are likewise insulated from the base 1 at its points of support thereon, as indicated at 15b in Fig. 19.

Referring next to the apparatus for applying the welding current to the stock, with which the present invention is most particularly concerned, a pair of upright rotatable contactor carriers, designated generally at 25, are provided. Each of the contactors 25 is mounted to rotate in a substantially upright plane and is adjustable to different positions vertically. The planes of the carriers are adjusted to converge in the direction of travel a sufficient amount to compensate for closure of the seam cleft so that the contactors may travel inwardly with the stock. The carriers are rotatably mounted in suitable housings 26, one for each carrier, each housing 26, in turn, being carried on a bridge 27, the ends of which bridge are slidably received on the upright posts 2. Brackets 28 are also provided to assist in supporting carriers. Suitable means are provided for securing the bridges in the proper adjusted position in the posts 2. Insulation has been provided at proper places, as illustrated in Fig. 4, to prevent any material losses of the current by dissipation through mounting of the carriers or the carriers themselves.

Figures 4, 21, 22:
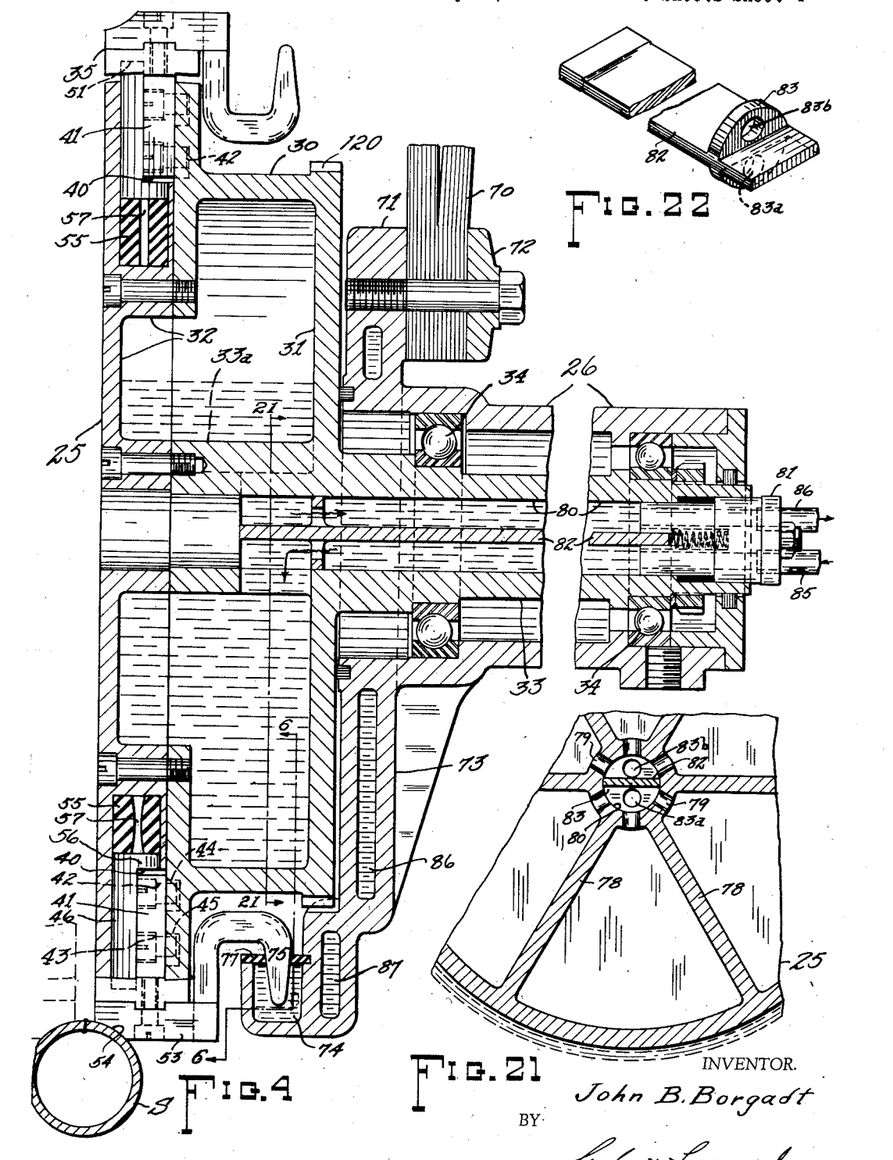
Fig. 4 is an enlarged cross sectional view of one of the contactor carriers and mounting illustrated in Fig. 3, and is taken on a plane indicated by the line 4—4 thereof.
Fig. 21 is a reduced fragmentary sectional view of one of the carriers illustrating the cooling system employed, and is taken on a plane indicated by the line 21—21 of Fig. 4.
Fig. 22 is a perspective view of one of the baffles employed in the cooling system.

As better illustrated in Fig. 4, each carrier comprises a hollow generally cylindrical cup shape body 30 having an imperforate rear wall 31, the inner end of the body being closed by a head plate 32 so as to provide a water tight cylindrical internal cavity when assembled. Extending from one side of each carrier 25 is a hollow bored stub shaft 33, rotatably mounted in spaced sets of bearings 34 within the housing 26 so as to rotatably support the carrier. The opposite end 33a of the shaft extends across the interior of the cavity and preferably is integral with the body 30 so as to form the interior into an annular compartment.

Mounted about the circumference of each carrier, near the inner face, are a plurality of electrical contactors, designated generally at 35, which successively engage the stock S as the carrier is rotated. As above mentioned, the axes of the carriers are positioned at a slight angle to each other so that the contactors travel in relatively converging paths in the direction of travel of the stock.

As set forth in the objects of the invention it is highly desirable, and, in fact, necessary, for efficient application of current to the stock and to prevent heating and sparking between the contactors and surface of the stock engaged thereby, that an appreciable contact surface be maintained in contact with the stock at all times. In the usual disc electrodes or contactors, the length of the contact area in the direction of travel of the stock is necessarily limited due to the curvature of the disc in the direction of travel. This area is increased in some instances by distorting the stock by pressure of the disc electrodes, thereby causing the stock to be engaged by a greater part of the circumference of the electrode. Such distortion of the stock is undesirable and impossible if a heavy current is used which heats and softens the stock in the contact zone. Furthermore, the pressure under which such electrodes engage the stock is not uniform at all points of engagement but is concentrated near the longitudinal center of the area contacted, and gradually diminishes in both directions from the said center. Attempts have been made to overcome this objection by utilizing extremely large diameter discs. This, however, while ameliorating the condition to some extent, does so only in degree and does not meet the fundamental desideratum of effecting uniform contact pressure over an area coextensive with the area engaged by the electrode or contactor.

In the present structure, series of contactors movable independently with respect to each other are provided, so that not only is the desired contact area obtained regardless of size, but also, the contact pressure is uniform throughout the entire length of the contacted area.

More specifically, in the disc type of electrode, due to the circular contour of the electrode in the direction of travel of the stock, the contact pressure begins at zero, increases to the mid-portion of the contact area and then gradually decreases to zero as the disc and stock relatively separate. At the beginning and end of the contact area, therefore, there is an application of current in an area of light contact with the results that sparking occurs which damages both the electrode and stock, and heating and oxidation of the electrode itself, accompanied by a waste in electrical energy, are present.

In the present apparatus, the contact between the contactors and the stock is effected instantaneously over the entire length and breadth of each contactor and is uniform over the entire contactor. Furthermore, the pressure is uniform as to all contactors of either series which are in engagement with the stock. Upon withdrawal of the contactors from the stock, the contact surfaces are withdrawn over the entire length and breadth instantaneously. Both the application and removal of contactors are effected while, by means of adjacent contactors, ample contact area is provided for conducting to the stock all the current necessary for heating. In fact, the contactors are positioned in parallelism with the stock immediately before their application thereto and are in parallelism at the instant of withdrawal.

Figure 3:
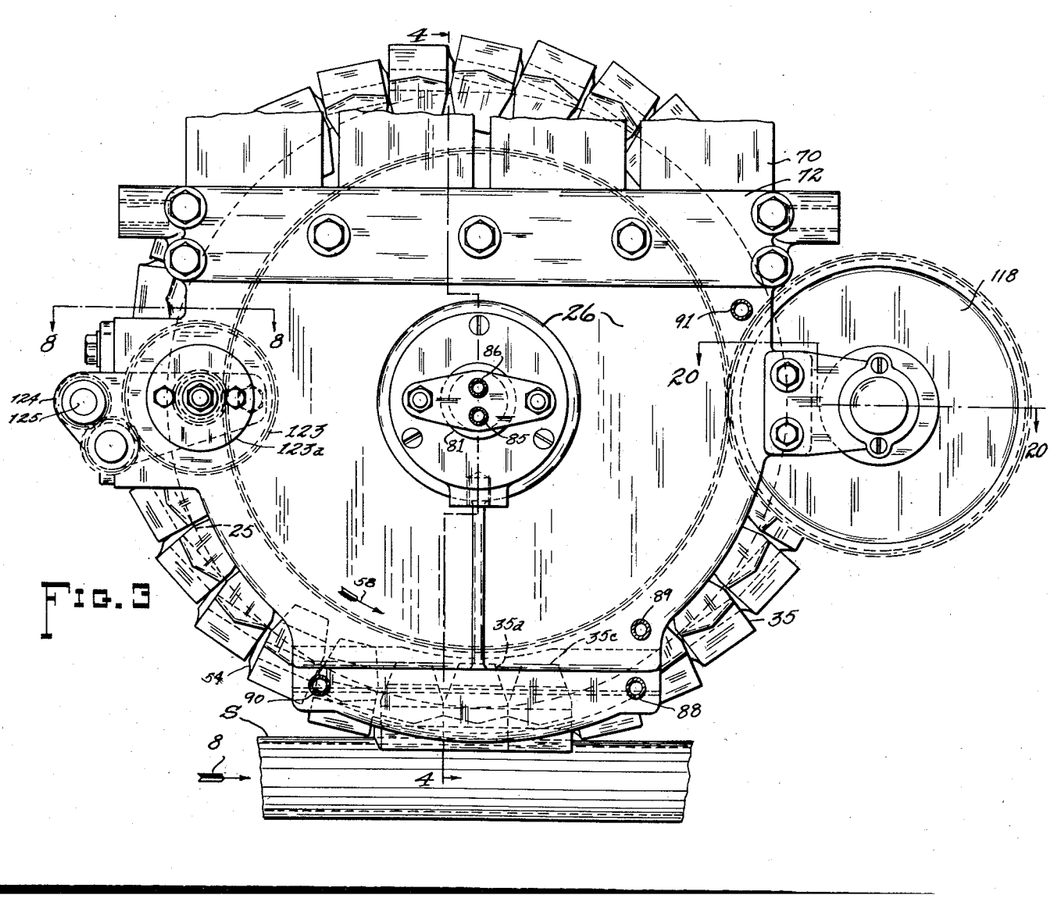
Fig. 3 is an enlarged side elevation of one of the contactor carriers and repositioning means of the apparatus.

In order to effect these results, the contactors herein illustrated and mounted in the manner hereinafter described, are effective. Referring particularly to Figs. 3 and 4, each carrier, only one of which need be described, is provided near its inner face with a circumferential channel 40. Each of the contactors 35 is provided with a radially extending shank 41 which is snugly received within the channel 40 so as to mount the contactors therein for floating movement both radially and circumferentially of the carrier and independently from each other. Carried on the shank of each contactor are laterally extending positioning pins 42 and 43 which extend into cam openings 44 and 45 in one of the side walls of the channel 40. It will be noted, particularly from Fig. 14, that the cam openings 44 and 45 are, in both instances, larger than the pins received therein so that, though the contactors are permitted floating movement, in the plane of the carriers, this movement is limited and controlled. The walls defining the cam openings 44 and 45 are fixed in a definite relation to the pins and to each other so as to maintain the proper position of the contactor associated therewith preparatory to, during, and subsequent to welding engagement of the contactors and stock, as will be described more fully hereinafter.

Mounted within the channel 40, one for each contactor, are pressure applying plungers 46 which plungers are slidable radially only of the contactor. Each plunger is provided with a flat face engageable with the face of the shank of the contactor with which associated so that the plunger is maintained by the shank in proper position and cannot rotate about its own axis. The body 47 of each contactor extends laterally from the shank 41 so as to form on its upper surface suitable shoulders 48 and 49 for engagement respectively with the outer edges of the walls defining the channel 40. In the lateral extension 48 of the body 47, on the face adjacent the shank, is a slot, the base of which forms a cam track 50 extending longitudinally of the contactor. On the lower end of the plunger 46 is a cooperating cam surface 51 which is received on the cam track 50 so as to transmit pressure from the plunger to the contactor when the plunger is forced radially outwardly relative to the contactor or carrier. The surfaces 48 and 49 of each contactor are preferably beveled inwardly and the edges of the walls defining the channel 40 are complementarily beveled so that pressure applied by the edges of the walls against the surfaces 48 and 49 tend to maintain the contactor centered and prevent binding and misalignment thereof. Secured on the body 47 of each contactor is a face plate 53 having a stock contacting surface 54 substantially complementary to the particular stock to be welded, the plates 53 being detachably secured to the bodies 47 so that the contactors may readily be adapted to different sizes of tubing by changing the face plates.

In order to exert outward radial pressure on the plunger 46 so as to force the contactor more firmly against the stock to be welded, a suitable resilient means is provided. Most effective for this purpose is a rubber cushion 55 which is mounted in the base of the channel 40 in position to engage the head 56 of the plunger. Ordinarily, in a case of rubber cushions, the pressure would increase disproportionately upon compression of the rubber a predetermined degree. This, however, is overcome and nearly constant pressure is obtained by providing in the rubber cushion a comparatively wide slot 57 which extends parallel to the width of the shank 41 of the contactor. Consequently, the resilience and yieldability of the cushion do not result wholly from direct action of the rubber but from the bowing of the rubber, at opposite sides of the slot 57, inwardly and resultant bulging into the slot. Since ample room is provided by the slot 57 for the yielding of the rubber, sufficient movement of the plungers at the required pressure is permitted.

Referring next to the manner in which the contactors engage the stock to be welded, as previously explained, each of the contactors extends a considerable distance longitudinally of the stock, as illustrated in Fig. 3. Necessarily, therefore, the contact surfaces of the contactors do not define a circumference concentric with the carrier but define a series of chords of a cylinder of substantially the same radius as the path of the contact surfaces. Therefore, when the carrier is rotated in the proper direction, indicated by the arrow 58 in Fig. 3, if the contactors were held in fixed position relative to the contactor, the leading edge of each contactor would engage the stock and dig into the stock before the remainder of the contactor engaged. Likewise, upon leaving the stock the trailing edge would move beyond the surface of the stock toward the stock axis and dig in. Such a structure could not operate properly to effect the results desired. Furthermore, as explained above, it is desirable that at least one contactor of each series be in full engagement with the stock at all times and during the instant of application of the adjacent trailing contactor and the withdrawal of the adjacent leading contactor.

Since all of the contactors are to engage the stock over their entire length, it is apparent that the welding surface defined by adjacent contactors in engagement with the stock will be substantially a continuous unbroken surface. Furthermore, since the contactors are to be removed from and to be applied to the stock while maintaining their parallelism thereto, the contactors must necessarily shift relative to the carrier as they pass from the mid portion of the contact zone. For example, the contactor 35a in Fig. 3 is positioned with its shank extending radially of the carrier and its welding surface being substantially tangential to the carrier. The trailing contactor 35b has its contact surface positioned in parallel with that of the contactor 35a and since this surface is elongated in the direction of travel the shank of the contactor 35b must necessarily be disposed parallel to a radius to the contactor 35a. Correspondingly, the same is true of the contactor 35c which is leading in the direction of travel and is to be withdrawn from the stock.

It is apparent that a radius from the center of the carrier through the welding face of the contactor 35b is disposed at an acute angle to the face of the contactor in the direction of travel of the contactor. This angle increases to 90° as the contactor reaches the position of contactor 35a and increases to an obtuse angle as it passes from the position 35a to 35c. Consequently, the contactors leave the stock with their contact surfaces inclined outwardly from the carrier in the direction of rotation thereof, and they pass into engagement with the stock with the contact surfaces inclined inwardly in the direction of travel. Therefore, means must be provided to reposition the contactors from the position in which they leave the stock into a position in which they will engage the stock properly by becoming parallel to it at the instance of application. This is accomplished by a repositioning means, the structure and operation of which is best illustrated in Figs. 8, 9, and 14 to 16 inclusive.

In these figures is shown a power driven rotatable cam 61 which is positioned to engage successively the outer face of the head plates 53 of the contactors adjacent to the stock engaging surfaces thereof. The cam 61 is arranged to cooperate with the pins 42 and 43 and the cam openings 44 and 45 for effecting the operation desired and holding the contactors firmly in their changed position. Adjustment of the cam 61 to proper position relative to the contactors is provided for by means of bolts operable in slots 123b in the driving hub 123a, which bolts secure the hub and cam in the desired relatively rotated position.

Figures 8, 9, 14, 15, 16:
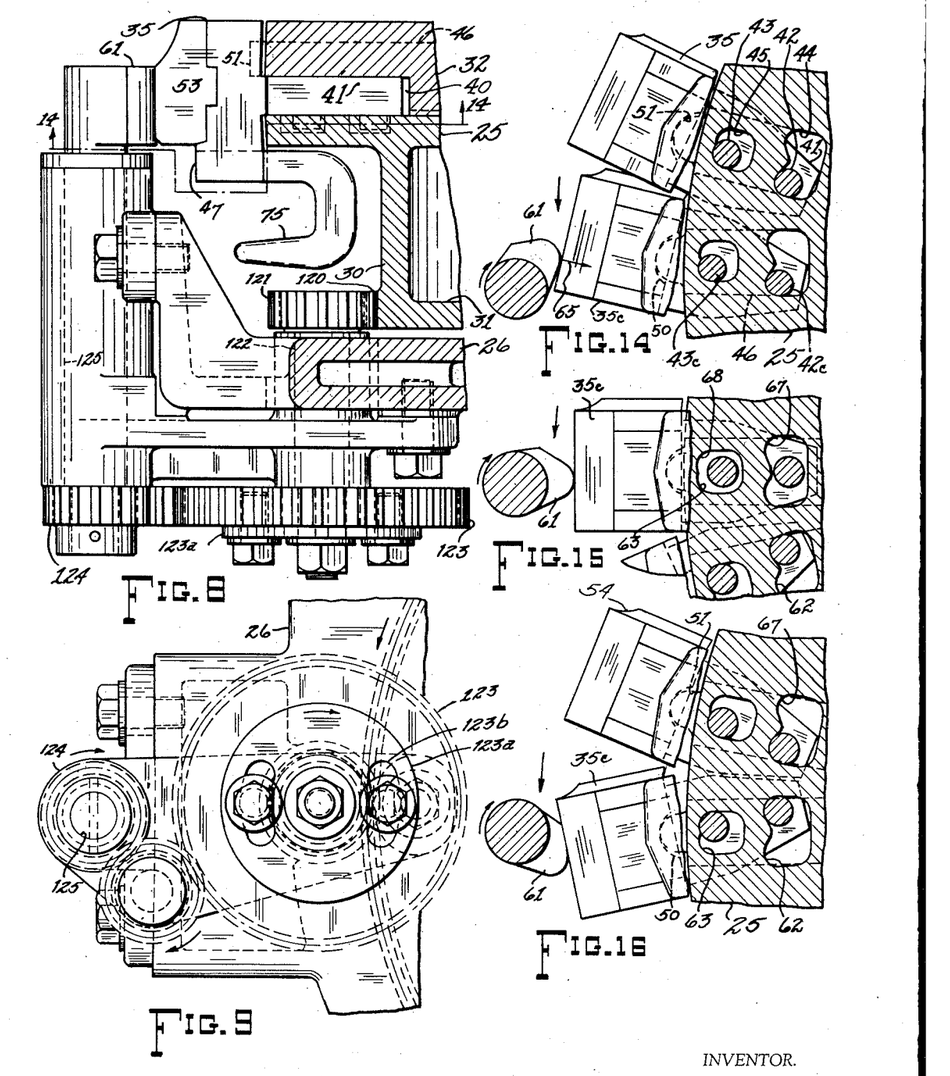
Fig. 8 is a sectional view taken on a plane indicated by the line 8—8 of Fig. 3, showing the contactor resetting means and driving mechanism therefor.
Fig. 9 is an enlarged front end elevation of the apparatus illustrated in Fig. 8.
Figs. 14, 15, and 16 are fragmentary sectional views of the contactors and resetting mechanism illustrating successive steps in the resetting operation, Fig. 14 being taken on a plane indicated by the line 14—14 of Fig. 8.

Referring specifically to Fig. 14, the contactor 35c is in the position in which it was withdrawn from the stock at the completion of the current applying operation. In this position, the pressure of the plunger has forced the contactor outwardly generally radially of the carrier and the pins 42c and 43c are firmly pocketed in engagement with the surfaces of the cam pockets 62 and 63 of the cam openings 44 and 45 respectively, the pins being held firmly in position therein due to the fact that the cam pockets 62 and 63 partially embrace the respective pins and also due to the outward pressure of the plunger 46. In this position the contactor 35c is engaged by the rotatable cam 61. The cam 61 is so formed that, as the contactors are progressed by the carrier toward the welding position, the surface of the cam 61 rolls along the engaged surface of the contactor 35c without any slippage between said surfaces. Upon continued progression of the contactors in the direction set forth, and indicated by the arrows in Figs. 14 and 16, the contactor 35c is moved to the position indicated in Fig. 15, in which position the cam has forced it radially inwardly of the carrier, lifting the pins 42c and 43c clear of the cam pockets 62 and 63 respectively, and forcing the plunger 46 inwardly radially of the carrier. This displacement of the pins is sufficient to permit them to clear the cam pockets 62 and 63.

Since the initial engagement of the cam 61 with its contactor is near the leading margin and in advance of the pins, the pressure exerted by the cam 61 is initially at the point of contact and in the direction indicated by the arrow 65. Therefore it pivots the contactors about the end of the plunger throwing the contact head portion in advance of its position whereupon the pins 42c and 43c are swung opposite to the direction of travel of the contactor.

Referring to Fig. 16, the cam 61 has moved 90° from the position illustrated in Fig. 14 and has permitted the contactor to move outwardly under the influence of the plunger 46. In this position, however, the pins 42c and 43c have swung opposite the direction of travel a sufficient distance so that they lie substantially over the surfaces of the cam pockets 67 and 68, respectively in the cam openings 44 and 45 respectively in the carrier. In this position the cam 61 passes out of engagement with the contactor which, under the outward thrust exerted by the plunger 46, seats the pins in their respective pockets 67 and 68. Obviously, since the pins are different distances from the pivotal point about the head 51 of the plunger they must swing different distances during this operation and the cam openings 44 and 45 therefore must be correspondingly different from each other. The cam pockets 62 and 63 are positioned so that the pins 42c and 43c rest therein at the instance of withdrawal of the contactor from the stock while in parallelism therewith. The pockets 67 and 68 correspondingly are positioned to maintain the contactor with its contact surface in parallelism with the stock at the instant of application to the stock. Obviously, the shift of the contactors from the position in which set by the cam to the position in which they are re-engaged thereby is the reverse of the shift resulting from the contactors engaging the stock, the stock in the latter instance cooperating with the plunger 46 as a means to reposition the contactors in the position first described as they pass therealong.

Figure 10:
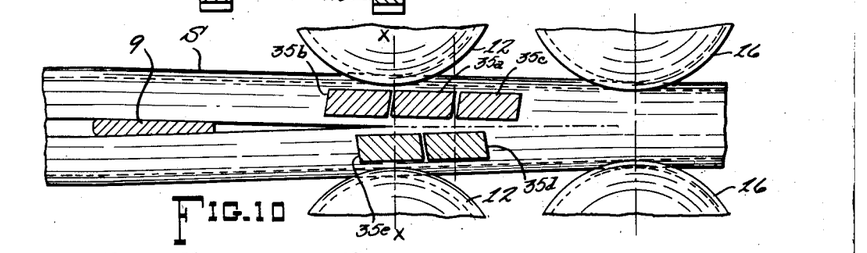
Fig. 10 is a diagrammatic plan view illustrating the positioning of the contactors on the stock.

Referring next to Figs. 10 to 13 inclusive, the engagement of the contactors with the stock is illustrated. In Fig. 10, three contactors of one series and two contactors of the other series are in engagement with the stock, the leading contactor 35c of the first series and the trailing contactor 35b being ready for instantaneous withdrawal and engagement respectively. This action takes place so that the contactor 35c leaves the stock the instant the contactor 35b engages the stock, an intermediate contactor 35a being in engagement of the stock during the operation of the adjacent contactors of the series. In the other series, the leading contactor 35d and trailing contactor 35e are both in full engagement with the stock and are in intermediate position. Thus at both sides of the seam cleft at least two contactors are in complete engagement with the stock at all times and move therewith along a lineal path, though any one thereof is sufficient to supply all of the contact area needed for the current required. The means for deflecting the contactors along the lineal path is the stock itself, the proper position of the contactors during this period being obtained by the conjoint action of the stock, the plungers, the pins and their cam pockets.

It should be borne in mind in referring to these figures that the trailing contactor 35b makes full contact with the stock before the seam cleft is closed by the rollers 12 and the leading contactor 35c leaves the stock shortly in advance of the upsetting rolls 15 and 16.

Figure 11:
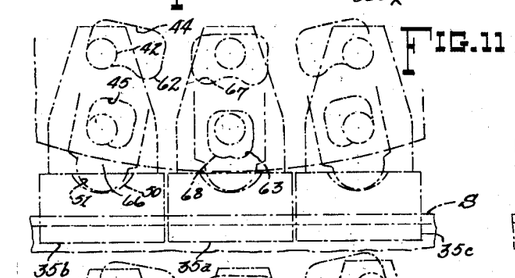
Figs. 11 to 13 inclusive, are diagrammatic side elevations of the contactors showing different operating positions thereof relative to the stock.
Figure 12:
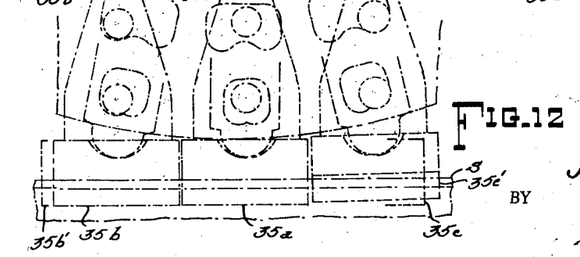
Figure 13:
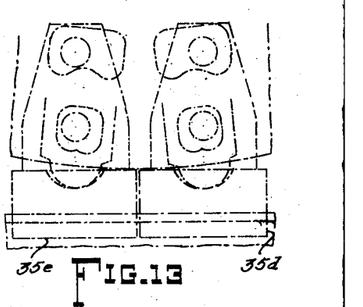
Figure 17:
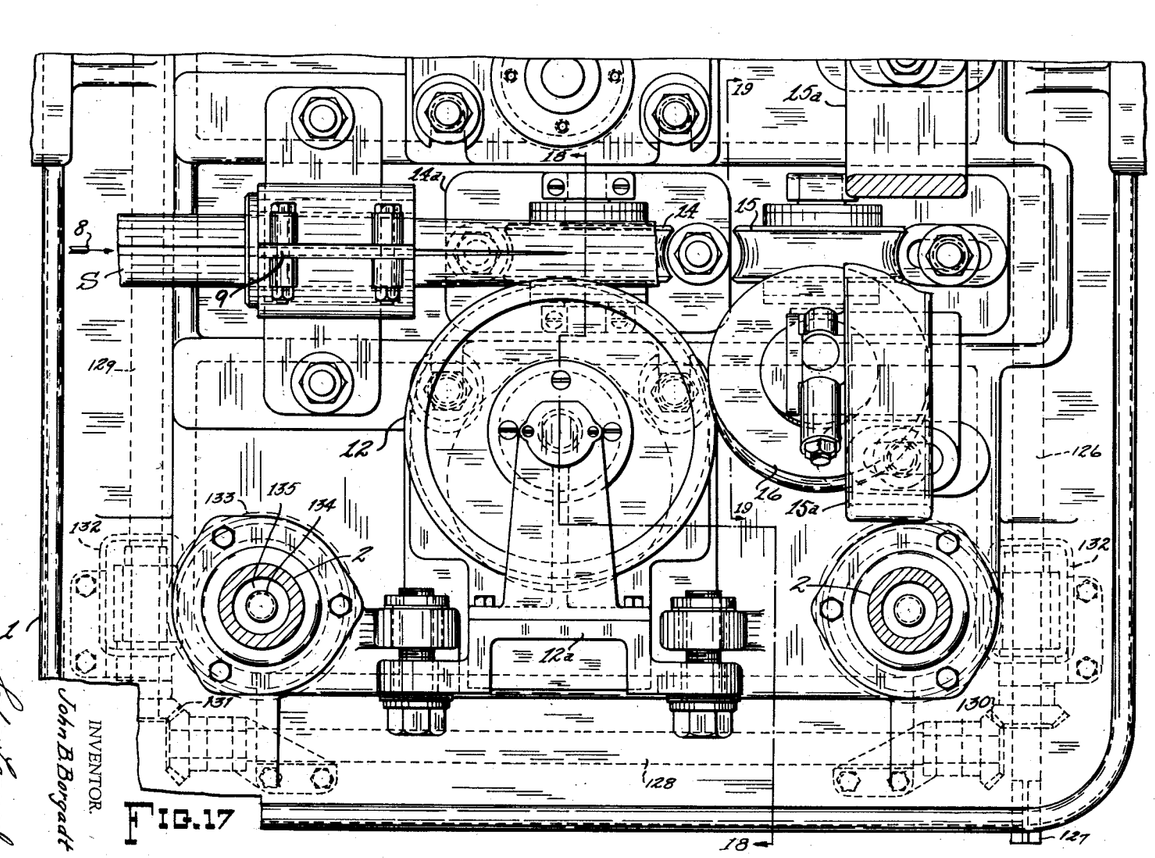
Fig. 17 is a sectional view taken on a plane indicated by the line 17—17 on Fig. 1, portions of the mechanism being removed for clearness in illustration.

Referring to Fig. 11, it will be noted that the position of the plunger head 51 changes relative to the cam track 50 of the contactors as the contactor passes from the initial stock engaging position to withdrawal position. The cam tracks are arcuate in a plane radially of the carrier, the mid portion thereof being as near concentric with the plunger head 51 as practicable from the manufacturing standpoint, both theoretically having a common center at the point indicated at 66. Therefore, there is no appreciable slippage between the plunger head 51 and its associated cam track 50 but only a rolling engagement as the contactors are forced against the stock or are re-engaged by resetting cam 61. Furthermore, the cam track is of very slightly greater radius so that the point of engagement between the plunger head 51 and the track is substantially always at the longitudinal center of the contactor or only a very slight amount on each side of the center. By reason of this, the pressure applied on the contactors by the plunger is uniformly distributed thereover. This pressure is also applied so near the contact face of the contactor that rocking of the contactor due to the slight angularity of the line of force of the plunger from a normal line to said surface is eliminated.

As the electrodes pass into engagement with the stock they are held in firm engagement by the yieldable pressure of the plunger until substantially in the intermediate portion of the welding zone at which point the circumferential edges of the walls defining the channel 40 are in rolling engagement with the surfaces 48 and 49 of the contactors, thus holding them firmly against the stock being welded.

It should be noted that as the surfaces 48 and 49 pass under the edges of the carrier while in contact with the stock that some pressure is exerted by the edges of the carrier itself thereon. If the ends of the contactors were parallel and 90° to the path of travel of the stock any such pressure would be exerted at one edge of the contactor only as engagement and disengagement of the surfaces 48 and 49 by the carrier were effected. In order to prevent concentration of this pressure across the free end of any contactor, the ends of the contactor are parallel to each other but not 90° to the path of travel. Instead, the ends extend on a slight bias to a line $x$—$x$ which is 90° to the path of travel as indicated in Fig. 10. Thus any radial pressure applied on a leading contactor is gradually shifted to the adjacent trailing contactor and at no time is the entire pressure on one or both contactors directly on or dangerously close to the ends thereof. Furthermore, the contactors of one set are staggered with relation to those of the opposite set so that at no time is there a portion of the stock which, for the entire circumference of the stock, is not engaged by a contactor. The pressure due to the carriers engaging the surfaces 48 and 49 is such relative to that provided by the plunger that the contactors are under substantially uniform pressure at all times while in contact and cannot slip or lift out of place.

The current is supplied to the contactors in a manner that will reduce all possible losses of transmission. To accomplish this, the secondary winding of the transformer 4 is comprised of a plurality of spaced leads 70, each of which comprises laminated sheets of copper. The leads 70 are connected at one end so as to supply current to the contactors of one carrier and at the opposite end to supply current to the contactors of the other carrier. In order to reduce the losses of transmission, the leads 70 are carried as close as practical to the point at which the current is passed to the contactors proper.

For accomplishing this purpose the ends of the leads 70 are fixedly secured by a clamp 72 to a bus bar 71 which is preferably formed integral with and as part of the housing 26. Depending from the housing 26 and integral therewith is an extension 73 terminating at its lower end in a trough 74 which contains the mercury bath which forms the make and break connection of the transformer secondary with the contactors. Both the housing 26, the bus bar 71 and extension 73 and all current conducting parts are of sufficiently reduced wall thickness to eliminate eddy currents during the transmission of the current to the contactors.

Carried by the face plate of each contactor is a contact blade 75 which may be integral with or brazed onto the contact face plate with which associated. The contact blade 75 is preferably in the form of an inverted hook, the free end of which is positioned to travel along the interior of the trough 74 as the carrier rotates. The mercury bath in the trough 74 is of sufficient depth to provide as much contact area as is needed to substantially carry all of the current that can be carried by the face plate or an amount far in excess of that required for the welding operation. The free end portion of the contact blade 75 which is immersed in the mercury bath is preferably silver plated and after a short period of operation an amalgam with the mercury is formed on the surface so that as it contacts with the bath it forms substantially a continuous unbroken integral electrical connection.

The trough is of sufficient length and depth so that the contact blades 75 are fully immersed in the bath preparatory to engagement of the contactors and the stock and remain therein until after the contactors have passed out of engagement with the stock. The trough 74 is closed at the top by a resilient rubber cover 77 which is provided with a central longitudinal slit so as not only to protect the mercury bath and fully enclose it, except adjacent a passing contact blade, but also to wipe the contact blades as they pass into and out from the bath. All electrical connections are preferably made by brazing the connected portions together with silver between the brazed surfaces. Thus it will be seen that the path of current from the transformer to the contactors is substantially continuous and unbroken and without any sliding contacts and is shortened materially both mechanically and electrically over the current paths heretofore provided in continuous welding apparatus.

Each mercury bath is contained in a trough so shaped that neither the bath nor the trough forms a closed ring or loop. The reason for providing a bath of this shape is to prevent the bath from forming a short circuited secondary ring or loop with respect to the current flowing between the bath and conductors, as such a loop would translate a large amount of useful current into destructive heat and act the same as a short circuited secondary winding of a transformer. The present baths are so shaped that they are constrained from this short circuited secondary relationship to the current passing between the blades of the contactors and the associated bath.

In all such equipment there is a tendency for heating and it is necessary to provide a means for cooling the apparatus. Due to the great amount of contact surface between both the shanks 41 of the contactors and the contact heads with the carrier with which associated, heat in the contactors passes readily into the carrier. Consequently, it is only necessary to dissipate the heat rapidly from the carrier itself. For accomplishing this purpose the arrangement illustrated in Figs. 4 and 21 will be found highly satisfactory. The interior of the contactor is divided into sectorial compartments by means of radial partition walls 78, each of the compartments being sealed with respect to the others except for its single outlet opening 79 which opens into the central bore 80 of the carrier.

The bore 80 is plugged at the inner end and extends throughout the stub shaft 33 to the outer end thereof at which position it is capped by a suitable cap 81. Within the bore 80 is a horizontally extending partition wall 82 which is fixed in position so that the shaft 33 rotates relative thereto. Carried by the partition wall 82 is a plug 83 which is snugly received in the bore 80 and substantially fills the same. The plug, in turn, is provided with a discharge passage 83a and an inlet passage 83b, the discharge passage being arranged above the partition wall 82 and the inlet passage below the wall 82. Mounted in the cap and discharging into the lower compartment formed in the bore 80 by the wall 82 is an inlet pipe 85 for supplying cold water thereinto. Correspondingly, a water discharge pipe communicates with the upper compartment of the bore 80. Thus as the openings 79 of the respective sectorial compartments are at the lower portion of their paths of travel, they are in communication with the lower compartment of the bore 80 and cold water is discharged thereinto. Upon continued rotation of the carrier, however, the sectors pass out of communication with the lower compartment and the openings thereof communicate with the upper compartment of the bore 80 in which position they can readily drain through the upper compartment thereof. Thus each sectorial compartment of the carrier is filled with cooling medium once each revolution and the cooling medium is discharged once each revolution so that any steam formed therein can readily escape so that the water that has become heated is completely evacuated and replaced by cool water preparatory to re-entrance into the welding zone.

Correspondingly, the extension 73 is provided with cavities 86 and 87 which, as better illustrated in Fig. 3, are provided near the bottom with suitable inlet passages 88 and 89 respectively for supplying cooling water thereinto and discharge passages 90 and 91 respectively for permitting escape of the cooling water.

It is apparent from the foregoing description that the feeding apparatus of the tubular stock, the rotation of the carriers, and operation of the resetting mechanism must be driven in timed synchronous relation with respect to each other. For accomplishing this result the driving mechanism illustrated is effective. It is desirable that the entire mechanism be driven from a single source of power which, in the present instance, may be the motor M. The motor, in turn, drives the main driving shaft 93 through a suitable belt or chain and pulley connection, for example, the belt 94. Carried at each end of the shaft 93 and driven thereby are worm gear reduction mechanisms 95 and 96, the first of which is in driving relation to the feed rolls 6 and the second of which drives take-off rolls 18 of the apparatus, both through suitable gear connections.

For driving the throat rolls 12, suitable sprockets 105 and 106 connected by a chain are provided, the sprocket 105 being provided on the main shaft 93 and the sprocket 106 being carried on a suitable reduction gearing 107. The reduction gearing 107, in turn, is drivingly connected to the main driving gears 108 which, as better illustrated in Fig. 18, drive the shafts 109, to each of which shafts is connected one of the seam closing rolls 12. The throat roll 14 is an idler roll. Carried on the shaft of one of the take-off rolls 18 is a sprocket 112 which, through a chain 113, is drivingly connected to the sprocket 114. As better illustrated in Fig. 20, the sprocket 114 is rotatably mounted on the driving shaft 115 and drives this shaft through the medium of a slip clutch 116 so that the device is fully protected in event the apparatus becomes jammed in any manner. Also, the clutch drives the carriers with such speed that the contactors and lineal speed of the carriers are the same as the speed of the tube. The synchronous speed of the working parts therefore may be slightly in excess of this.

Figure 20:
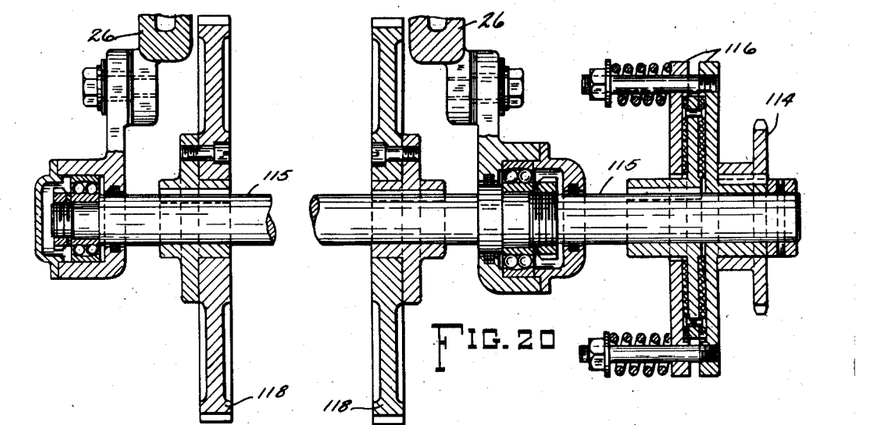
Fig. 20 is a longitudinal sectional view of the driving mechanism for driving the contactor carrier and is taken on a plane indicated by the line 20—20 on Fig. 3.

Carried on the shaft 115 are the main driving gears 118. Carried one on each of the contactor carriers are external gears 120 which gears are driven by the respective gears 118 for rotating the carrier in the direction indicated on Fig. 1. Insulation is provided, as shown, through the apparatus to prevent loss of current or short circuiting, the points at which such insulation is necessary being readily apparent to one skilled in the art without detailed description. The insulation between the main driving gears 118 and the gears 120 on the contactor carriers is provided by making the gears 118 of nonconducting material such as is commonly used for timing gears and the like. The shaft 115 is likewise insulated by insulating its supporting brackets from the elements 26, as best illustrated in Fig. 20.

At the diametrically opposite side of the contactors from the main driving gears 118 is the resetting mechanism heretofore described. This mechanism is better illustrated in Figs. 8 and 9, the relative position thereof in respect to the contactors being clearly illustrated in Figs. 1 and 3. The resetting mechanism is driven by the gear 120 in a predetermined increased speed relation. This is accomplished through the gear 121 which meshes with the gear 120 and is fixedly mounted on the shaft 122. To the opposite end of the shaft 122 is operatively connected the external spur gear 123, the driving connection between the shaft 122 and the gear 123 being through the medium of the circumferentially adjustable hub 123a which is rigid with the shaft 122. The gear 123, in turn, drives a smaller gear 124 and through it the cam shaft 125, the cam shaft having its axis substantially parallel to the axes of rotation of the contactors so that the cam 61 carried thereby may engage the contactors with a rolling contact during the resetting operation.

In order to raise or lower the carriers and with them the transformer, a shaft 126 is rotatably mounted in the base 1 and is provided at one end with a head portion 127 to which a suitable crank may be applied for rotating the shaft. Correspondingly, shafts 128 and 129 are driven by the shaft 126 through suitable beveled gearing as indicated at 130 and 131 respectively. Near each end of the shaft 126 and near the ends of the shaft 129 are suitable worm gears 132 which engage gears 133, each of which carries a jack screw 134 in threaded engagement with corresponding threads 135 in the interior of the posts. Thus the posts 2 and the transformer and carriers carried thereby are lifted while maintaining their fixed relative position with respect to each other.

Figures 5, 6, 7, 23, 24, 25:
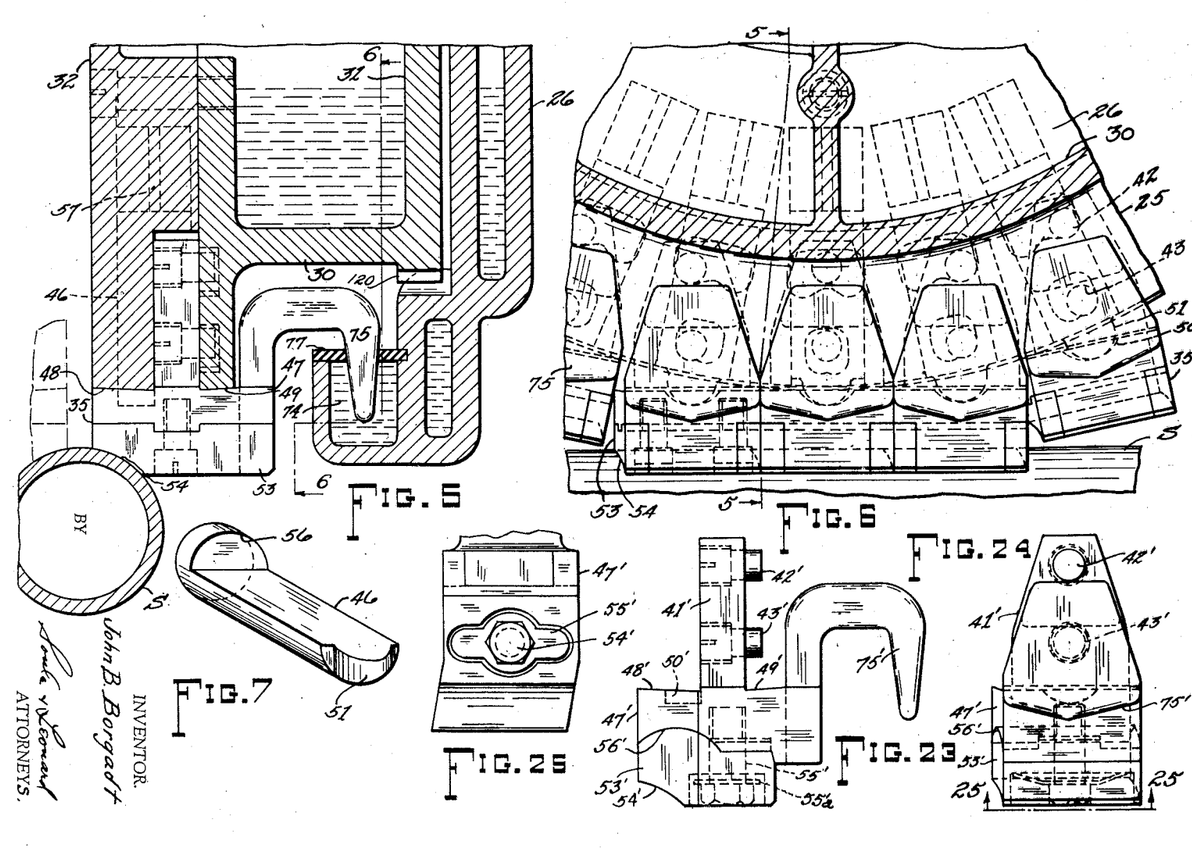
Fig. 5 is an enlarged fragmentary sectional view of one of the carriers and contactors carried thereby and is taken on the plane indicated by the line 5—5 of Fig. 6.
Fig. 6 is an enlarged fragmentary sectional view of the contactor carrier illustrated in Figs. 4 and 5 and is taken on a plane indicated by the line 6—6 of Figs. 4 and 5.
Fig. 7 is a perspective view of one of the pressure applying plungers for the contactors.
Fig. 23 is a side elevation of a slightly modified form of contactor.
Fig. 24 is a side elevation of the contactor illustrated in Fig. 23, taken at 90° to the position illustrated in Fig. 23.
Fig. 25 is a bottom plan view of the contactor illustrated in Figs. 23 and 24 and is taken from a position indicated by the line 25—25 of Fig. 24.

Referring to Figs. 23 to 25 inclusive, a modified form of contactor is provided for use in those instances in which the pre-formed stock is not accurately formed to give a perfect contact with the face plates of the contactors. For this purpose, a self-aligning face plate 53' is utilized instead of the usual plate 53. This face plate is yieldably secured to the contactor by means of a bolt 55' and spring 55a' so as to move relative to the head portion 47'. The head 47' and plate 53' are provided with complementary curvilinear contact surfaces which are preferably of greater area than the stock engaging surface of the plate engaging surface 53'. The connection of the plate 53' with the head 47' is such as to permit rocking of the plate 53' transversely of the axis of the stock. Thus it may swing around a center while maintaining full contact with the stock and with the contact head 47' so as to move inwardly with the stock as the seam cleft is closed.

In order to better determine the proportion of the machine, its general features are illustrated in connection with the welding of six inch standard pipe with 6⅝ inches outside diameter and stock gauge 0.280. The carrier in such instance would be 20 inches in diameter, each carrying thirty contactors so that a contact area of not less than 5 square inches is in contact with the stock at all times. At a speed of 60 feet per minute, the power requirements at the transformer are 200 kw. or less. Each point on the stock is exposed to the full force of the current and to a large number of complete full intensity current reversals under full contact pressure throughout a welding zone of a little over 4 inches and for a period of about a third of a second. Thus forty reversals of current are provided at each point along the seam cleft. By virtue of this action "stitch" welds are eliminated and a true and complete butt-weld is provided. In the welding of brass stock a higher speed and consequently a higher current consumption would be necessary.

It is apparent from the foregoing description that a series of electrical contactors are provided which engage the stock under substantially uniform pressure over their entire contact areas and are maintained in substantial parallelism with the stock at the instant of application or withdrawal therefrom. It further appears that in the apparatus illustrated, all sliding contacts are eliminated, and that the losses caused by eddy currents are reduced to a minimum. One moving contact only is provided and that is through the contact blades 75 but since this contact is made preparatory to the flow of current through the particular contactor with which associated and is made by immersion of such a large contact area in a mercury bath with an amalgam on the surface of the contactor blades which, in effect, operates in substantially the same manner as though it were a silver brazed fixed contact, the current losses between the transformer and contactors is negligible.

It is also clear that simple effective means has been provided to weld all commercial sizes and material of pipe stock and tubing by the resistance method, producing a true continuous butt weld.

Having thus described my invention, I claim:

1. In a continuous electrical welding apparatus, rotatable companion electric contactor carrier means, means for rotating said carrier means, contactors carried by said carrier means and positioned thereon to pass successively into contact with the material to be welded during travel of said contactors with the carrier means along a portion of the path of travel, means mounting the contactors for movement relative to the carrier means, contactor position retaining means operatively engaging said contactors and movable generally therewith and slightly relative thereto along a portion of the path of travel for maintaining each contactor in complete contact with the stock over the entire contact surface of the contactor during the entire period of engagement of said contactor with the stock.

2. In a continuous electrical welding apparatus, series of separated electrical contactors, rotatable carrier means mounting each series for continuous movement along a closed circuitous path, said series being in spaced relation to each other and the contactors thereof being adapted for engagement with the stock to be welded, one series at each side of the seam cleft, during travel of the contactors along a portion of their respective paths, means mounting each contactor for movement relative to its carrier means, and means cooperable with the contactors for positioning the same to effect initial instantaneous complete complementary contact between the entire contact surface of each contactor and the stock.

3. In a continuous electrical welding apparatus, series of separated electrical contactors, carrier means mounting each series for continuous movement along a closed circuitous path, said series being in spaced relation to each other and the contactors thereof being adapted for engagement with the stock to be welded, one series at each side of the seam cleft during travel of the contactors along a portion of their respective path, and means to remove, instantaneously over its entire area, the entire contact surface of each of said contactors successively from the stock at the end of the said operation.

4. In a continuous electrical welding apparatus, rotatable carrier means, series of separated electrical contactors mounted thereon for continuous movement thereby along a closed circuitous path, means mounting the contactors for movement to different positions relative to the carrier means, said series being in spaced relation to each other and the contactors thereof being adapted for engagement with the stock to be welded, one series at each side of the seam cleft, during travel of the contactors along a portion of their respective paths, repositioning means engageable with each of the contactors along another portion of their path of travel operable to shift the position of each contactor relative to its respective carrier means into a position wherein the contact surface of each contactor will pass into substantial parallelism with the stock to be welded immediately at the instant of contact with the stock for effecting instantaneous complementary contact between the entire contact surface of each contactor and the stock.

5. In a continuous electrical welding apparatus, series of separated electrical contactors, carrier means mounting each series for continuous movement along a closed circuitous path, said series being in spaced relation to each other and the contactors thereof being adapted for engagement with the stock to be welded, one series at each side of the seam cleft, during travel of the contactors along a portion of their respective paths, means mounting said contactors for movement relative to the carrier means, and means cooperating therewith to move the contactors relative to their carrier means to position the contact surfaces of the contactors in parallelism with the stock at the instant of withdrawal from the stock for effecting instantaneous withdrawal of the entire contact surface of each contactor from the stock.

6. In an electric welding device, a series of independent electrodes, a rotatable carrier means upon which the electrodes are mounted for bringing the electrodes successively into operative engagement with the material to be welded, means mounting said electrodes for floating movement relative to the carrier means for permitting adjustment thereof, and means engageable with the electrodes of the series for adjusting the position thereof relative to said carrier means preparatory to engagement with the material for effecting proper welding engagement between each electrode and the material.

7. In an apparatus for the purpose described, an electric contactor carrier, a series of contactors arranged in a row around the periphery of said carrier and movable therewith for engagement with stock to be welded along a portion of the path of travel about said carrier, means for mounting said contactors on said carrier for limited inward and outward radial movement and bodily circumferential movement relative to the carrier whereby the position of said contactors relative to said carrier may shift consequent upon engagement of said contactors with the stock and travel with the stock along a linear path of movement during part of their travel with said carrier and pass out of engagement with the stock with their contact surfaces inclined outwardly of the carrier in the direction of travel, and means engageable with said contactors preparatory to reengagement with the stock for moving the same to dispose the contact surfaces thereof in a position inclined inwardly of the carrier in the direction of travel.

8. In a continuous electric welding apparatus, a series of electrical contactors, carrier means for driving said contactors continuously along a closed path, the contactors being adapted for engagement with the stock to be welded during travel of said contactors along a portion of said path, means for effecting yieldable engagement of each contactor and said stock while in contact relation, and means mounting the contactors for limited floating movement in a direction longitudinally of the path of travel of the stock relative to the carrier means whereby the contact surfaces of the contactors may be maintained in fixed relation to the stock as the seam cleft is closed while moving with the carrier means.

9. In a continuous electric welding apparatus, rotatable companion electrical contact carriers, a series of separated electrical contactors mounted on each carrier and rotatable thereby about the axis thereof in a substantially circular path, said series being in spaced relation to each other, the contactors of each of said series being arranged in a row with respect to each other and adapted for successive engagement with the stock to be welded, one series at each side of the seam cleft, during travel along a portion of the path of movement, means mounting said contactors for limited inward and outward movement relative to said respective carriers, means engaging said contactors and effecting substantially simultaneous and complete engagement of one contactor with the traveling stock and withdrawal of another contactor of the same row while maintaining an intermediate contactor of the same row in complete engagement with the stock.

10. In a continuous welding apparatus, rotatable electric contactor carriers, series of contactors, one series carried by each of said carriers and movable thereby normally in a substantially circular path concentric with the carrier during the major part of each revolution of the carrier, said contactors of each series being arranged in a row about the periphery of their respective carriers, means mounting said contactors for limited movement in the planes of the respective carriers, and means for deflecting said contactors of each series from their circular path and maintaining them along a substantially lineal path during a part of each revolution, and retaining a plurality of successive contactors of the same row in said substantially lineal path of movement in contact with the stock simultaneously.

11. In an electric welding device for welding a continuous joint, a series of independent, adjustable electrodes, a circular rotatable carrier upon which the electrodes are mounted for bringing the electrodes successively into operative engagement with the material to be welded, means mounting said electrodes for movement relative to the carrier for maintaining contact between the end faces of each electrode of the series with the adjacent end faces of adjacent electrodes of said series during travel of the electrodes along the part of their path of movement wherein they are in engagement with the material, and means for moving said electrodes into said face engaging position.

12. In a continuous electrical welding apparatus, a rotatable electric contactor carrier, a series of contactors mounted around the periphery of said carrier and continuously traveling therewith during rotation of the carrier, said contactors successively engaging the stock to be welded along a predetermined portion of their path of movement, each of said contactors having a longitudinal pressure surface, means in relative rolling engagement with said surface for maintaining said contactors in contact with stock to be welded during movement along said portion of said path, the limits of said surface of each contactor in the direction of travel of the stock being diagonal to the path of travel and limits of said surfaces of successive contactors adjacent to each other being parallel with each other whereby said means rolls into engagement with the pressure surface of a succeeding contactor before passing out of engagement with the pressure surface of an adjacent preceding contactor.

13. In a continuous electrical welding apparatus, a series of electrical contactors, means for moving said series continuously along a closed circuitous path, the contactors of each series being adapted for successive engagement with the stock to be welded during travel of said contactors along a portion of said path, contact heads on each of said contactors, each contactor and its respective head having complementary contact surfaces, means mounting said heads on the respective contactors for movement transversely of the path of travel of the contactors while maintaining said respective heads and contactors with said complementary surfaces in contacting relationship, and means to close the seam cleft while the contact heads are in engagement with the stock, whereby said heads maintain contact with the stock and move inwardly therewith in contact during closure of the cleft.

14. In a welding apparatus for the purpose described, having a hollow rotatable contactor carrier disposed in a plane inclined to the horizontal, means dividing the interior of the carrier to a plurality of discommunicated compartments, a feed conduit for cooling fluid, a discharge conduit, means communicating the compartments successively with the feed conduit as said compartments are moved along one portion of their path of travel by rotation of the carrier, and means communicating said compartments successively with the discharge conduit when said compartments are moved along another portion of the path of travel consequent upon continued rotation of the carrier.

15. In a continuous electrical welding apparatus, a rotatable electrical contactor carrier, a series of separated electrical contactors carried by said carrier and rotatable thereby about the axis thereof, means mounting said contactors thereon for floating movement relative thereto, the contactors of each series being adapted for successive engagement with the stock to be welded during travel along part of the path of movement about said axis, means for holding said contactors with the contact surfaces in complete contact with the stock while in engagement therewith, said means including a plurality of pins on each contactor, cooperating shoulders on said carrier engageable therewith, and means for yieldably guiding said shoulders and pins into proper contact.

16. In a continuous electrical welding apparatus, a pair of series of separated electrical contactors, each series being arranged for continuous movement along a closed circuitous path, said series being in spaced relation to each other and the contactors of each series being adapted for engagement with the stock to be welded, one series at each side of the seam cleft, during travel of the contactors along a portion of said path, contact blades carried by each contactor, mercury baths disposed along the paths of travel of said series respectively, in position to receive the blades of the contactors of the series with which associated, during passage of said contactors along said portion of said path and said contactors of each series leaving the said associated path during travel along another portion of the path of travel, and means for supplying welding current to the respective mercury baths.

17. In a continuous electrical welding apparatus, a pair of rotatable contactor carriers, series of separated electrical contactors carried one series by each carrier, said series being in spaced relation to each other and the contactors of each being adapted for engagement with the stock to be welded, one series at each side of the seam cleft during travel of the contactors along a portion of said path, contact blades carried by each contactor, troughs of conducting material electrically connected to a source of welding current by stationary fixed connections, and positioned along the path of travel of each series in position to receive the blades of the contactors of the series with which associated, during passage of said contactors along the welding portion of said path, mercury baths contained in each trough and temporarily receiving said blades, and means for supplying welding current to the respective mercury baths.

18. In a continuous electrical welding apparatus, a pair of series of separated electrical contactors, each series being arranged for continuous movement along a closed circuitous path, said series being in spaced relation to each other and the contactors of each series being adapted for engagement with the stock to be welded, one series at each side of the seam cleft during travel of the contactors along a portion of said path, contact blades carried by each contactor, mercury baths disposed along the paths of travel of said series respectively in position to receive the blades of the contactors of the series with which associated continuously during passage of said contactors along the welding portion of said path, and immediately prior and subsequent to said welding portion, and means for supplying welding current to the respective mercury baths.

19. In a continuous electrical welding apparatus, a rotatable electric contactor carrier having a peripheral channel, a series of contactors mounted around the periphery of said carrier and continuously traveling therewith during rotation of the carrier, said contactors successively engaging the stock to be welded along a predetermined portion of their path of movement, each of said contactors having a longitudinal pressure surface portion and a shank portion extending laterally therefrom and received within said peripheral channel for mounting said contactor for floating movement relative to the carrier, whereby the contact surfaces may move in a lineal path while in engagement with the stock, plungers respective to the contactors mounted for radial movement in said carrier, means urging the plungers radially outwardly, cam heads on said plungers engaging the respective contactors near the plane of the welding surfaces thereof for urging the contactors firmly against the stock.

20. In a continuous electrical welding apparatus, continuously rotatable contactor means for engagement with traveling stock to be welded for applying welding current to said stock, conductor means on the contactor means and movable therewith for conducting current thereto, and a mercury bath electrically connected to a source of welding current for receiving said conductor means during movement thereof and providing an electrical connection between said conductor means and said source of welding current, and being related with respect to the conductor means so that each contact point of the conductor means successively enters and leaves the bath during rotation of the contactor means.

21. In a continuous electrical welding apparatus, a pair of rotatable contactor means engageable with the stock to be welded, one contactor means at each side of the seam cleft, during travel of the contactor means along a portion of their respective paths, mercury baths respective to the contactor means and disposed along the paths of travel of said contactor means, electrical conductor means carried by the contactor means and positioned to be received temporarily in the baths of the contactor means with which associated during passage of said contactor means along a portion only of the path of travel, and means for supplying current to the respective mercury baths.

22. In a continuous electrical welding apparatus, a pair of rotatable contactor means engageable with the stock to be welded, one contactor means at each side of the seam cleft, during travel of the contactor means along a portion of their respective paths, conductor means carried by the contactor means respectively, mercury baths respective to the conductor means, each bath being disposed along the path of travel of the associated conductor means and receiving the associated conductor means therein, means for supplying welding current to the respective baths and each of said baths being constrained from short circuited secondary relationship to the current passing between the bath and associated conductor means.

JOHN B. BORGADT.